March 12, 1929.  W. J. HURST  1,705,365
TIRE VALVE LOCK
Filed Feb. 25, 1927
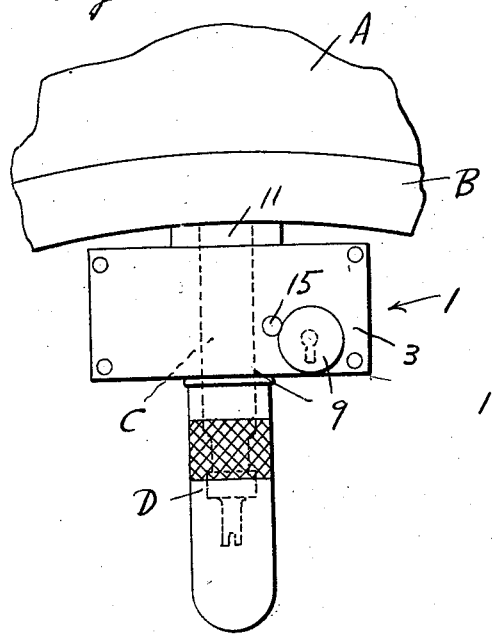
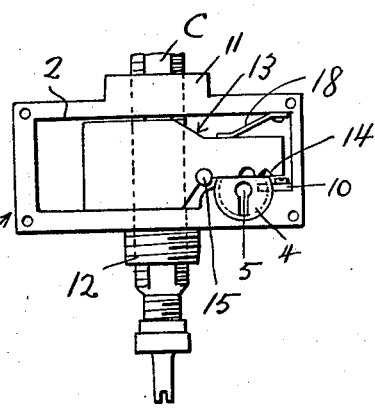
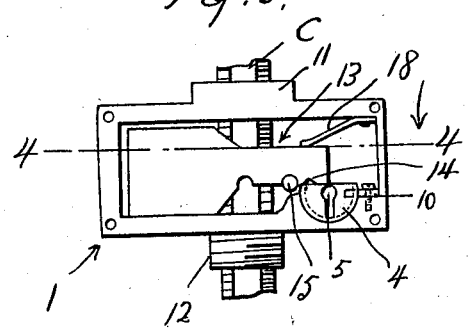
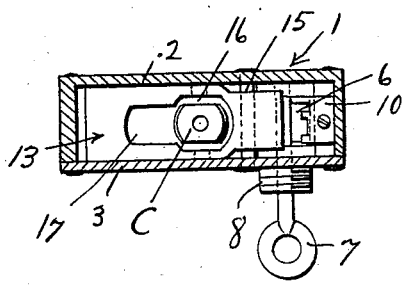
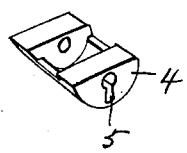
Inventor
William J. Hurst
By Clarence A. O'Brien
Attorney Patented Mar. 12, 1929.

1,705,365

UNITED STATES PATENT OFFICE.

WILLIAM J. HURST, OF MAQUCKETA, IOWA.

TIRE-VALVE LOCK.

Application filed February 25, 1927. Serial No. 170,866.

The present invention relates to an improved tire valve lock of the kind employed as a safety appliance to guard against unauthorized removal of automobile tires, whether on the wheel or on the spare carrier.

Briefly, the invention comprises a slidable key operated retainer mounted in a casing which is fitted over the valve stem, the retainer being such, in construction as to cooperate with the opposite flat faces of the stem in such a manner as to prevent rotary movement of the casing, thereby to hold the casing in place on the stem so that the casing operates as a removable lock nut to prevent the valve stem from being withdrawn through the opening in the tire rim.

Ordinarily, a common form of lock nut is threaded upon the stem to prevent such withdrawal. However, by removing the valve stem cap and taking off the nut, it is an easy matter to withdraw the stem through the opening in the rim and to remove the tire. The present invention, however, operates as a novel substitute for the ordinary lock nut, and it is prevented from being rotated about the stem and removed by the novel key controlled locking means which it includes.

The particular details forming the alleged novelty of the improved device will become more readily apparent from the following description and drawings.

In the drawings;

Figure 1 is a side view, showing, in dotted lines, the valve, together with fragments of the tire and its rim, and the novel valve retaining device.

Figure 2 is a view of the device, with the removable base plate off to disclose the internal construction, the retainer being shown in locking position.

Figure 3 is a view like Figure 2, simply showing the retainer slid over to releasing position.

Figure 4 is a horizontal section, taken on the line 4—4 of Figure 3, looking in the direction of the arrow.

Figure 5 is a perspective view of one of the details.

In the drawing, the reference character A designates a portion of an automobile tire, fitted on the rim B, C represents the valve, which is of ordinary construction, and D represents the removable valve cap. The improved valve retainer is represented generally by the reference character 1.

The retainer comprises a substantially rectangular casing 2, (see Figure 4), which is open on one side, the open side being closed by a removable cover plate 3, held in place in any appropriate manner. Mounted for rotation in one end of the casing is a barrel 4, (see Figure 5) which is of semi-circular configuration, and which is hollow at its center, the outer end of the barrel being provided with a key hole 5, which is designed to permit passage of the head 6, of the key 7. Attention is directed to the fact that this barrel is of a length greater than the width of the casing, and the outer end is screw threaded, as at 8, to remove a removable closing cap 9. Incidentally, this cap 9 is simply to cover the key hole to prevent accumulation of mud and dirt therein. Closely associated with the key barrel is a small plate 10, mounted within the right hand end portion of the casing. This plate is notched along one edge, the notches being of a shape to correspond to the projections on the head 6 of the key. In this connection, I might state that the notches will vary in each device as will the shape of the key head, in order that a separate key may be provided for each device. While considering the construction of the casing, it will be well to note that the same is provided on one side with an internally screw threaded neck 11, which, when in place, abuts the rim B. On the opposite wall of the casing is a nipple 12, which is internally screw threaded, and also externally screw threaded. The external screw threads are to accommodate the removable dust cap D. The internal threads are to engage the threads on the valve. Hence it will be seen that the casing can be turned on or off of the valve, somewhat in the same manner as the ordinary lock nuts. However, it is desired to prevent removal of the casing by unauthorized persons. This is accomplished in the following manner.

A retainer 13 is slidably mounted within the casing. The retainer is of general block-like form, and has snug fitting contact with the walls of the casing. As shown in Figures 2 and 3, this block, in top plan view, or in side elevation, whichever way it is considered, embodies an enlarged end portion and a reduced end portion. Formed in one edge of the reduced portion is a substantially V-shaped notch 14, for cooperation with the head of the key. Spaced inwardly from the head of this notch are two substantially semi-circular grooves for selective cooperation with a retaining pin 15, which extends transversely across the casing. Although formed in the block is an especially shaped opening, which includes an enlarged part 16 and a reduced part 17, (see Figure 4). Obviously, when the enlarged portion 16 of this opening is in the position represented in this figure, the entire casing and locking means, as a unit can be rotated and removed from the valve. However, when the reduced portion 17 is slid in the direction from left to right to dispose it for cooperation with the flat side of the valve as represented in Figure 2, the casing cannot be turned, and consequently cannot be removed. To hold this slidable retainer in place, I provide internal flat springs 18.

In order to obtain an understanding of the operation of the invention, it is to be assumed that the device is in the position shown in Figure 3, where it is unlocked. Of course, it could then be rotated on or off of the valve. Assuming then that the key 7 is inserted into the key hole 5, of the rotary barrel 4, the barrel is turned in the direction from right to left. The head of the key, moving in the hollow portion of the barrel, is received in the V-shaped notch 14 in the slidable retainer 13. Then, the retainer can be slid over, by further rotation of the key to assume the position shown in Figure 2. Of course, to accomplish the sliding action, it is necessary that the block be lifted against the action of the springs 18. When it is in the position shown in Figure 3, the outermost groove is engaged with the cross pin 15. When slid over to the position shown in Figure 2, however, the innermost groove then seats itself upon this same pin 15. When in Figure 2, the V-shaped notch 14 is located substantially over the notches in the guide plate 10, and consequently the head of the key can be turned through the notches in this plate and then removed through the keyhole. As before indicated, when the retainer is in position shown in Figure 2, the portion 17, (see Figure 4) straddles the opposite flat side of the valve.

Consequently, the device cannot be rotated and cannot be removed. It follows, therefore that the valve stem cannot be pulled out through the opening in the tire rim. In this manner the device operates as a safety appliance. Should an attempt be made to drive the device off by the impact of blows from hammers or tools, the valve would become distorted and could not be removed through the opening in the rim.

From the foregoing description and drawings, it will be seen that I have provided an exceptionally novel contrivance for application upon a tire valve, to prevent unauthorized removal of the tire. It is believed that when the description is considered, in connection with the drawing, a clear understanding of the invention will be had. Therefore, a more lengthy description is believed unnecessary.

It is further thought that in construing the alleged novelty in this case, the device may, in its entirety be considered as a substitute for the ordinary lock nut, including a key controlled locking device, such as may be manipulated to either prevent rotation of the device, or to permit rotation.

Minor changes coming within the field of invention claimed may be resorted to, if desired.

I claim:

1. As a new product of manufacture, a hollow casing constructed to be threadedly mounted upon the stem of a tire valve, a retainer mounted for sliding movement in the casing, said retainer being of block like form, being provided with a V-shaped notch and with longitudinally spaced transversely extending grooves, a pin in said casing selectively engageable with said grooves, a rotary key barrel in said casing, said key barrel being constructed to permit the head of the key to be engaged with said V-shaped notch in order to slide said retainer in said casing to permit the pin to be seated in either one of the grooves, said retainer having an opening for passage of the valve, said opening being constructed with enlarged and restricted portions for cooperation with the opposite flat sides of the valve.

2. As a new article of manufacture, a tire valve locking device comprising a hollow casing open on one side formed on opposite walls with screw threaded portions to surround the valve, a cover plate for the open side, a block like retainer slidably mounted within said casing, said retainer embodying an opening for passage of the valve, said valve including enlarged and restricted portions adapted for disposition in alignment with said screw threaded portions of the casing, a spring in the casing cooperable with the retainer, a rotary key barrel in the casing cooperable with the retainer, said retainer including means whereby the key may be engaged therewith for sliding it in the casing and locking the casing to the valve or unlocking it from the valve.

In testimony whereof I affix my signature.

WILLIAM J. HURST.